(12) United States Patent
Lichtenwald et al.

(10) Patent No.: US 12,379,003 B2
(45) Date of Patent: Aug. 5, 2025

(54) CLUTCH WITH A PISTON THAT CAN BE ACTUATED ON BOTH SIDES AND MECHANICAL ENGAGING ELEMENTS

(71) Applicant: Schaeffler Technologies AG & Co. KG, Herzogenaurach (DE)

(72) Inventors: Viktor Lichtenwald, Fürth (DE); Knut Erdmann, Nuremberg (DE)

(73) Assignee: Schaeffler Technologies AG &Co. KG, Herzogenaurach (DE)

( * ) Notice: Subject to any disclaimer, the term of this patent is extended or adjusted under 35 U.S.C. 154(b) by 0 days.

(21) Appl. No.: 18/718,567

(22) PCT Filed: Nov. 16, 2022

(86) PCT No.: PCT/DE2022/100858
§ 371 (c)(1),
(2) Date: Jun. 11, 2024

(87) PCT Pub. No.: WO2023/110005
PCT Pub. Date: Jun. 22, 2023

(65) Prior Publication Data
US 2025/0052287 A1    Feb. 13, 2025

(30) Foreign Application Priority Data

Dec. 13, 2021   (DE) ..................... 10 2021 132 822.5

(51) Int. Cl.
*F16D 25/061*    (2006.01)
(52) U.S. Cl.
CPC .................. *F16D 25/061* (2013.01)

(58) Field of Classification Search
CPC ....... F16D 25/06; F16D 25/061; F16D 25/083
See application file for complete search history.

(56) References Cited

U.S. PATENT DOCUMENTS

| 3,071,224 A | 1/1963 | Crankshaw |
| 4,064,979 A | 12/1977 | Crankshaw |
| 2017/0363178 A1 | 12/2017 | Rekow et al. |
| 2019/0195290 A1* | 6/2019 | Suzuki ................ F16H 37/0846 |

FOREIGN PATENT DOCUMENTS

| DE | 102014213884 A1 | 2/2015 |
| DE | 102017207136 A1 | 12/2017 |
| DE | 102021101141 A1 | 7/2022 |
| JP | H04203626 A | 7/1992 |

* cited by examiner

*Primary Examiner* — Timothy Hannon (57) ABSTRACT

A clutch for selectively coupling a motor and a motor vehicle drive train includes a housing having two pressure chambers, a shift sleeve, an actuating cap arranged for moving the shift sleeve, a piston, an idler gear and a mechanical engaging element. The piston is arranged in the housing between the two pressure chambers in a pressure-dependent, axially movable manner and is connected to the actuating cap. The mechanical engaging element is arranged between an axially movable component and an axially fixed component to engage the shift sleeve in two different axial positions. The axially movable component may be the shift sleeve or the piston, and the axially fixed component may be the housing or the idler gear.

11 Claims, 6 Drawing Sheets

CLUTCH WITH A PISTON THAT CAN BE ACTUATED ON BOTH SIDES AND MECHANICAL ENGAGING ELEMENTS

CROSS-REFERENCE TO RELATED APPLICATIONS

This application is the United States National Phase of PCT Appln. No. PCT/DE2022/100858 filed Nov. 16, 2022, which claims priority to German Application No. DE102021132822.5 filed Dec. 13, 2021, the entire disclosures of which are incorporated by reference herein.

TECHNICAL FIELD

The present disclosure relates to a clutch for coupling and decoupling a motor from a motor vehicle drive train. The clutch includes a piston which is arranged in a housing, having for example pressure ports, between two pressure chambers, each connected to one of the pressure ports, in a pressure-dependent axially moveable manner. The piston is connected in a material-locking, form-locking, and/or force-locking or integral manner, for example, to a separate or integral actuating cap, which is provided for contacting/moving a shift sleeve.

BACKGROUND

Decoupling devices for separating a motor from a drive train are already known from the prior art. For example, DE 10 2021 101 141 A1 discloses such a decoupling device, which can also be referred to as a clutch.

This prior art relates to a decoupling device for separating a motor from a drive train, including a piston, which is moveably mounted in a housing parallel to a longitudinal axis L of the housing and which has an arm for directly or indirectly actuating a clutch element. A first region of the piston is operatively connected to a first pressure space such that when pressure is applied to the first pressure space, the piston is moved in a first direction parallel to the longitudinal axis L, and a second pressure space is provided which is operatively connected to a second region of the piston such that when pressure is applied to the second pressure space, the piston is moved in a second direction parallel to the longitudinal axis L, said second direction being opposite the first direction. The disclosure also relates to such subject matter which is to be considered covered here. This prior patent application particularly emphasizes that the first region is located at a first longitudinal end of the piston and the second region is formed by a depression in a lateral surface of the piston and that the depression is formed on an outer half of the lateral surface of the piston, viewed radially with respect to the longitudinal axis L. Furthermore, it has been found to be expedient that each of the pressure spaces is provided with a pressure port. In addition, the piston is designed as an annular piston which extends about the longitudinal axis L.

Furthermore, the prior patent application-which is to be considered disclosed and included here with respect to the functional relationships and interactions as well as the geometry-contains a first ball bearing which is located radially inside the piston and on which the arm of the piston is mounted. There should be a claw on which the first ball bearing rests radially on the inside and which is designed to actuate a clutch element with a free end. A second ball bearing may be included, on which the housing is supported radially on the outside.

Similar devices are also known from DE 10 2014 213 884 A1 and JP H04 203 626 A.

SUMMARY

The present disclosure provides a clutch including at least one mechanical engaging element designed and arranged between an axially moveable component and an axially fixed component such that the shift sleeve can be engaged/is engaged in two different axial positions, depending on the operating state.

Ultimately, a DCU/disconnect unit for electric axles with hydraulic actuation, including engaging elements, is at the heart of the present disclousure. Due to the residual, unwanted pressures in the switching piston (port P1 or P2) from the hydraulic system, an unusual movement of the switching piston occurs in the pressure chambers P1 and P2, and due to the interlocking connection of the switching piston to the shift sleeve, movement of the shift sleeve also occurs. Such unwanted movements are critical in terms of both function and functional safety (e.g. breakage of the toothing, uncontrolled driving of the vehicle). This can be realized in the hydraulic system with additional effort, or is complex to realize in the pressure valves because of costly, additional valves. This is no longer necessary.

At the same time, due to the complex hydraulic valves, controllability and positioning of the switching piston has also not been robust. An improvement is also achieved here. The use of engaging elements in/with moveable parts leads to improvement in DCUs. An engaging element between the switching cylinder and the switching piston as the one engaging element, for example as a slotted wire ring, formed wire ring or as a pressure piece with a spiral spring, is effective. At the same time, it is also useful to use an engaging element between the shift sleeve and the idler gear. The task of both engaging elements is to avoid the unusual axial movement of the switching piston, which is achieved. The axial force is distributed to both engaging elements, and the end positions of the shift sleeve and the switching piston are ensured at the same time. Axial play between the shift sleeve and the switching piston is guaranteed to minimize friction.

An improved disconnect unit with hydraulic actuation is now being introduced, in particular, for front axles and dual drive electric axles. Due to the current findings and the new concepts with positive locking (not frictional locking), solutions of this type are still unknown.

The present disclosure thus provides a system that works for bilaterally actuated/interacting pistons. The new concept focuses on developing two variable pressure spaces within one housing using a baffle plate and a variable pressure port using a pressure space sleeve. In order to return to the disengaged state when the claw clutches are closed, a baffle plate is arranged behind a second seal and the design of the pressure space is changed. In a first variant, a housing design is presented which contains a piston that can be actuated in two directions. The piston is inserted into the housing with two seals as in the case of a standard hydraulic clutch slave cylinder. The first pressure chamber and the pressure port are disposed next to, for example on the right side of, the annular piston and provide a forward stroke. A second pressure chamber is then disposed next to, for example to the left of, a tapered portion of the annular piston. This second pressure chamber is made possible by inserting a baffle plate with a third seal into the housing and securing it with a snap ring. It has a second pressure port which moves the piston back to the left when pressure is applied, thus forming the return stroke. In some embodiments, however, the piston may be made in two parts for assembly.

In some example embodiments, the second pressure chamber is moved inwards, to the underside of the piston. In order to accommodate a pressure port in a confined space on the inside of the housing, a pressure space sleeve is used. This is provided with an annular groove and two O-rings on the sides and is fixed in the housing with a snap ring. Two holes within the annular groove ensure the flow of the operating medium.

In general, it is understood that the piston should be guided and centered via a sliding band. The baffle plate is sealed to the housing with an O-ring. The end stop is realized via additional webs on the baffle plate when the claw is open. Sensor displacement measurement is provided in both variants. An X sealing ring can be used because it is pressurized on both sides (alternately) (pressure chambers 1 and 2).

The disclosed device is suitable for a front-wheel electric axle and hydraulic actuation of the coupling/decoupling unit, especially when a claw clutch is used.

Hydraulic actuation now makes it easier to control the end stops of the switching piston. This means that there is no longer any unacceptable NVH noise between the shift sleeve and a clutch body. Here, an S-disk is used as an end stop between the securing ring and the clutch body. The S-disk can be designed to be elastic especially for the application and thus reduce the noise at the end stop. The S-disk can be mounted between the clutch body and the securing ring with appropriate preload force. An improved disconnect unit with hydraulic actuation is now possible, especially for electric front axles and dual drive electric axles. Although concepts with multi-plate clutches are known on the market, they are now being improved. While the plates were previously constantly pre-loaded with switching pistons and the end stops in multi-plate clutches were the plates themselves, an improved variant is now possible. Owing to the current requirement, the claw clutch with interlocking connection is used instead of a multi-plate clutch. However, end stop switching noises are avoided. Due to the hydraulic actuation, the end stop points of the switching piston are still not easy to control, but unacceptable noises are avoided. Hard end stops between the clutch body and the shift sleeve are avoided. Currently known end stops, which rely on an interlocking connection, for example use "bumps" on the clutch body or rely on an interlocking connection, for example by means of three end stops on the shift sleeve itself, are now unnecessary. The disclosed device uses an S-disk as an end stop between the securing ring and the clutch body. The S-disk can be designed to be elastic especially for the application, thereby reducing the noise at the end stop. The S-disk can be mounted between the clutch body and the securing rings with appropriate preload force.

The present disclosure thus relates to a DCU/disconnect unit for electric axles, including a switching crown with two functions. Concepts with multi-plate clutches are known on the market. Until now, the plates were constantly pre-loaded using switching pistons. The soft end stop of the multi-plate clutch was the plate itself. Owing to the current requirement, the torque clutch with interlocking connection is used instead of a multi-plate clutch. This causes switching noises when engaging (tooth-on-tooth position), which can now be avoided. Due to the hydraulic actuation, it is not easy to control the tooth-on-tooth position of the switching piston/switching crown with the appropriate speed and force. This is still the case, but the previously unacceptable NVH noises are avoided. These would otherwise occur between the shift sleeve/switching sleeve and the clutch body. Currently known solutions were with synchronization and a shift fork with corresponding rigidity.

In addition, the switching crown/switching piston had to be installed with the shift sleeve. This is now all avoided and the axial rigidity is preconfigured. Assembly is simplified. The hard end stop in the tooth-on-tooth position between the clutch body and the shift sleeve is reduced. Robust assembly is realized with the aid of the snap connection to the shift sleeve. The solution uses the special design of the switching crown, which simultaneously takes into account assembly and the axial rigidity. The switching crown has a special arm design for assembly and for rigidity. Using the lever for radial rigidity, it is possible to realize the snap connection on the groove in the switching crown/the switching piston to the web on the shift sleeve. The lever for the axial rigidity also makes it possible to easily adjust the axial rigidity.

The engaging element may be arranged in the (axially) moveable component, namely the switching sleeve or the piston on the one hand, and the axially fixed component, namely an idler gear or the housing on the other hand.

It is expedient if the engaging element is arranged in a spring-loaded manner in a seat in the axially fixed (or axially moveable) component in order to selectively engage in a latching manner between two grooves in the axially moveable (or axially fixed) component.

It has proven useful if the grooves form a depression that is beveled on both sides.

It is useful if an engagement/locking is forced when the engaging element engages in one of the two grooves.

In order to distribute the forces, it has proven useful to use a large number of engaging elements.

It is desirable if at least one of the engaging elements/the engaging element is shaped as a sphere or ball.

In an example embodiment, two detents, each with an engaging element, are present at the same radial distance from an axis of rotation of the clutch.

It is useful if the grooves are in a hardened insert.

Furthermore, a stop washer/baffle plate, e.g., separate from the housing and the piston, may be arranged in a pressure chamber, the stop washer/baffle plate limiting an axial movement of the piston at least in one axial direction. In this way, variable pressure spaces/pressure chambers and pressure ports for interacting pistons are provided. The disclosure then focuses on two variants for implementing variable pressure spaces for interacting pistons.

It is expedient if the stop washer is arranged radially inside or radially outside the piston. In the radially inner arrangement, for example, the piston may be formed in one piece with the actuating cap. Better use of installation space, especially smaller-scale use of installation space, may possibly be achieved with a radially outer arrangement. However, this could have disadvantages during assembly.

If the piston is provided for the application of pressure bilaterally/alternatingly, actuation in one axial direction and the opposite axial direction is possible in a small installation space.

It has also proven to be useful if the stop washer has at least one axial protrusion which is designed to strike the axial piston and penetrate one of the pressure chambers. The result is a targeted design and utilization of installation space.

If a plurality of axial protrusions protrude from an end face of the stop washer, in a manner distributed over the circumference, jamming of the piston/annular piston within the housing can be effectively prevented. An evenly distributed arrangement of the axial protrusions may be advantageous in this regard.

In an example embodiment, a snap ring fixed in the housing determines at least the axial position of the stop washer, for example together with a step of the housing.

The shift sleeve may be connected to the actuating cap. This can also simplify assembly. This connection can be permanent or temporary.

Furthermore, an end stop washer, designed to be elastic in the axial direction, may be present to limit the axial movement of the shift sleeve/switching sleeve.

It is expedient if the end stop washer has an S-shape or double S-shape in the longitudinal section along the axis of rotation of the clutch.

The end stop washer may be mounted in a pre-loaded manner.

It is also expedient if the end stop washer is attached to a shaft, for example an intermediate shaft.

In an example embodiment, the end stop washer is mounted with preload force between a clutch body provided for torque connection to the shift sleeve and a shaft-fixed securing ring.

It has proven to be effective if the radial extension of the end stop washer is larger than that of the clutch body.

A void may be enclosed between the end stop washer and the clutch body.

The securing ring may be arranged in a groove on the lateral surface of the shaft in an axially defined position.

In an example embodiment, the end stop washer is designed to be at least ten times (maximum 100 times) more elastic in the axial direction, i.e. the securing ring and/or the clutch body.

It is intended that the actuating cap has a portion that is designed as a cantilever arm and has a snap closure at one free end for engaging the shift sleeve.

The cantilever arm protruding from a main body of the actuating cap may be spaced apart by a slot/recess extending between the cantilever arm and the main body, by means of which slot/recess the elasticity/rigidity in the axial direction and radial direction may be specifically adjusted. The cantilever arm is therefore separated from the main body (mostly but not completely) via the slot. The extension allows the elasticity/rigidity to be specifically adjusted in both the axial direction and the radial direction.

It has proven to be useful if the slot extends only partially through the material of the actuating cap in the circumferential direction, but completely through the material in the radial direction.

It is also beneficial if there is an elongated hole in the cantilever arm. A precise adjustment of the rigidity/elasticity can then be made.

Production is simplified if the elongated hole runs parallel to the slot and preferably has the same axial width.

The cantilever arm may define a lever. Preconfiguration is then easier.

Assembly is easier if the snap closure with axial play surrounds a radial protrusion of the shift sleeve.

It is useful if the elongated hole is designed as a rectangular through-opening.

In an example embodiment, the cantilever arm is L- or Z-shaped.

It has also proven to be useful if the shift sleeve is connected to the actuating cap.

BRIEF DESCRIPTION OF THE DRAWINGS

The present disclosure is explained in more detail below with the aid of drawings. In the drawings.

DETAILED DESCRIPTION

The figures are only schematic in nature and serve only for understanding of the disclosure. Identical elements are provided with the same reference signs. The features of the individual embodiments can be interchanged.

Figure 1:
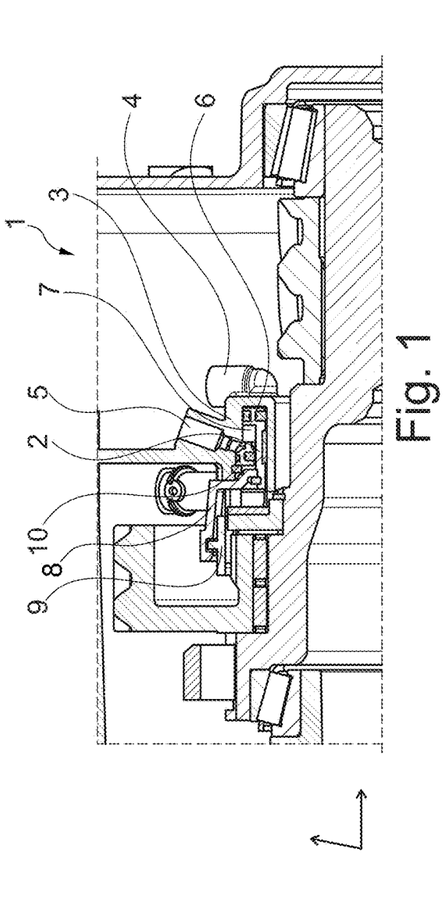
FIG. 1 shows a partially illustrated longitudinal section through a clutch according to the disclosure, wherein the two pressure spaces are located radially outside the piston.

FIG. 1 shows a clutch 1. It has a piston 2. Piston 2 is designed for the application of force bilaterally/alternatingly. It is arranged in a housing 3. Pressure ports 4 and 5 lead to a first pressure chamber 6 and a second pressure chamber 7 respectively. In this context, reference is made to FIGS. 2 and 3. The pressure port 4 leads into the first pressure chamber 6. The pressure port 5 leads into the second pressure chamber 7. Of course, this can also be the other way round.

Figure 5:
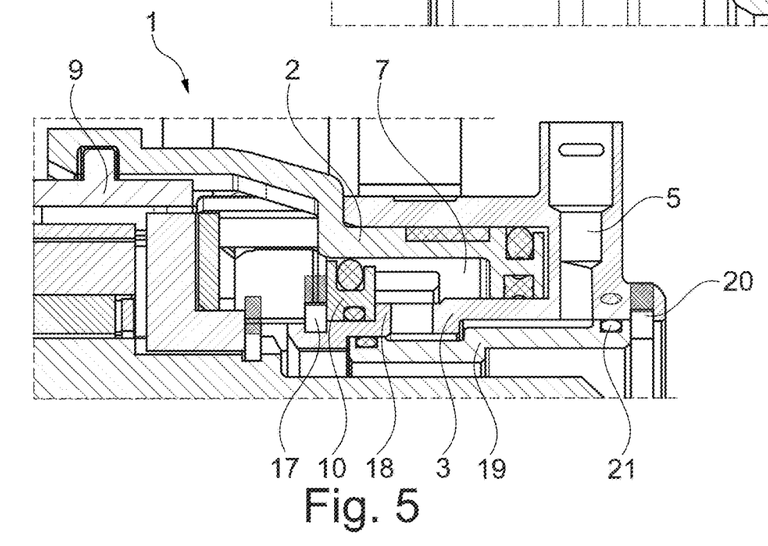
FIGS. 5 and 6 show the "claw engaged" (FIG. 5) and "claw disengaged" (FIG. 6) operating positions of the clutch from FIG. 4.
Figure 6:
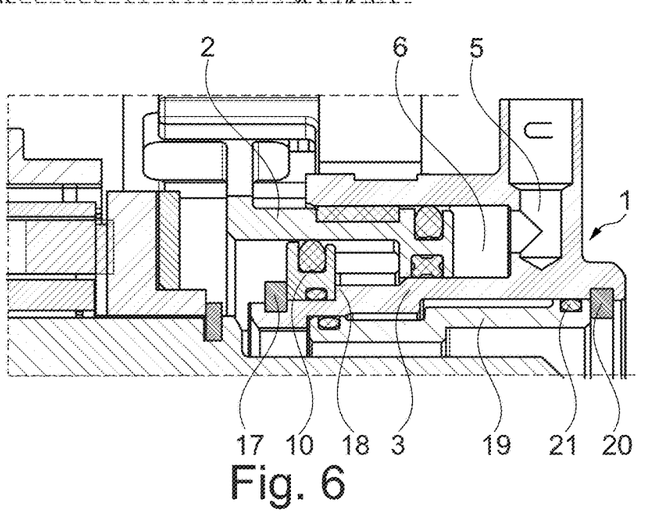

An actuating cap 8 is also attached to the piston 2. In the case of the clutch 1 from FIGS. 1 to 3, the piston 2 and the actuating cap 8 are two separate components that are attached to each other. In the case of the clutch 1 from FIGS. 4 to 6, the piston 2 and the actuating cap 8 form an integral, single-material and integral component.

The actuating cap 8 engages a shift sleeve 9. The clutches 1 from FIGS. 1 to 6 also have a stop washer/baffle plate 10. The stop washer 10 has a first seat 11 on the radial outside and a second seat 12 on the radial inside.

Figure 2:
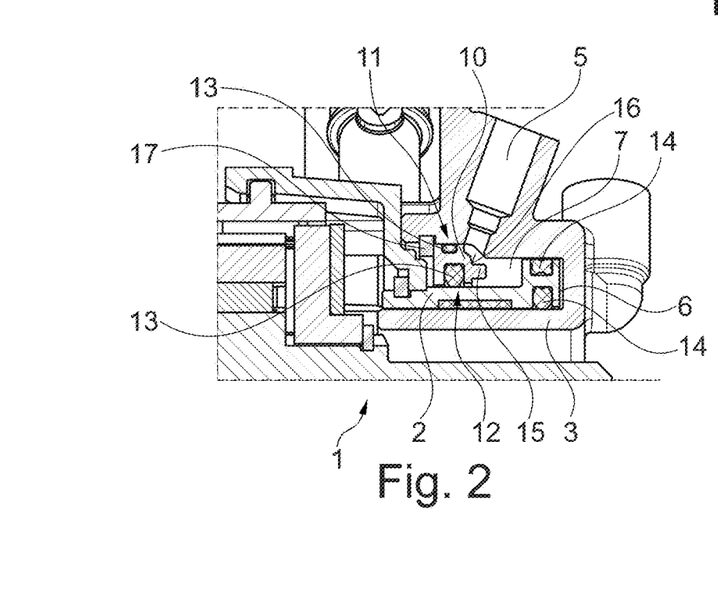
FIG. 2 shows the operating position of the clutch from FIG. 1 with the "claw engaged"
Figure 3:
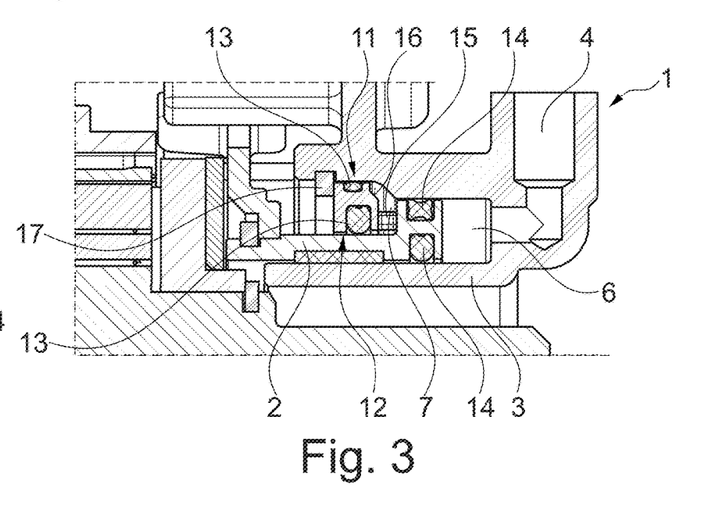
FIG. 3 shows the "claw disengaged" operating position of the clutch from FIGS. 1 and 2.

As can be seen in FIGS. 2 and 3, there is a seal 13 in each of the two seats 11 and 12. These seals 13 seal the pressure chamber 7, i.e. the second pressure chamber. Two further seals 14 seal the first pressure chamber 6. The stop washer 10 has an axial protrusion 15. In its "claw disengaged" operating position, the axial protrusion 15 extends completely through the second pressure chamber 7 and rests against the piston 2, as shown in FIG. 3. The axial protrusion 15 protrudes from an end face 16 of the stop washer 10.

There is a snap ring 17 and a step 18 by means of which the stop washer 10 is directly or indirectly fixed about its axial position. This is shown particularly well in FIGS. 5 and 6.

Returning to FIG. 4, reference should be made to a pressure space sleeve 19. This pressure space sleeve 19 connects the pressure port 5 to the second pressure chamber 7.

Figure 4:
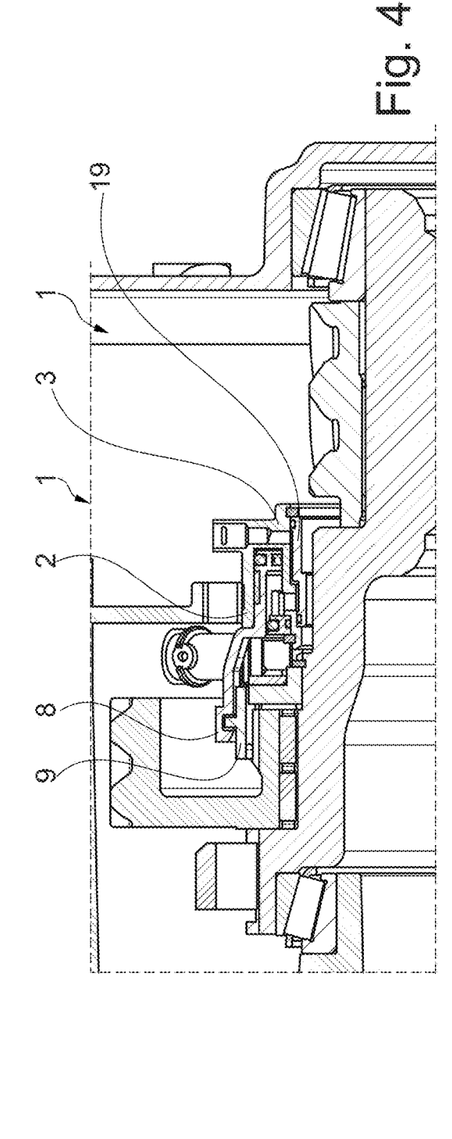
FIG. 4 shows a clutch according to the disclosure, wherein the pressure chambers are located radially inside the piston.

The pressure space sleeve 19 is fixed in its position by means of a pressure space sleeve snap ring 20 with the interposition of a seal in the manner of an O-ring 21.

Figure 7:
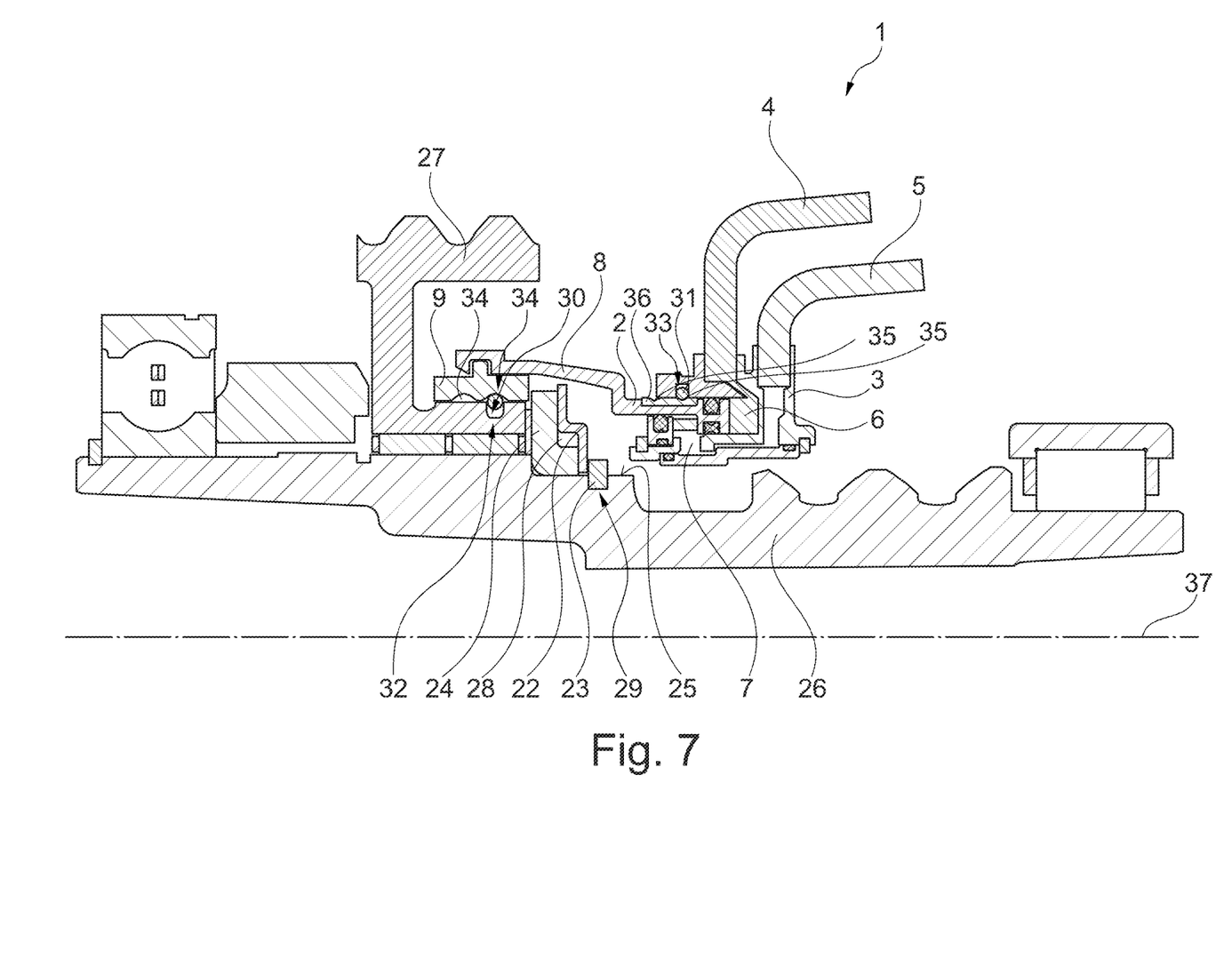
FIG. 7 shows a detail of a longitudinal section through a further clutch according to the disclosure in a first operating position, wherein an intermediate shaft with an end stop washer mounted thereon is used as a special feature.

FIG. 7 shows a clutch 1 with an end stop washer 22. The end stop washer 22 is arranged axially between a securing ring 23 and a clutch body 24. These last two components are located on a lateral surface 25 of an (intermediate) shaft 26. There is also an idler gear 27.

The end stop washer 22 has an S-shape and is elastic in the axial direction. It is made of sheet metal. A void 28 is enclosed between the end stop washer 22 and the clutch body 24. The securing ring 23 sits in a groove 29 in the lateral surface 25.

There are a plurality of engaging elements, namely the engaging element 30 and the engaging element 31. Both the engaging element 30 and the engaging element 31 are designed as spheres. The engaging element 30 sits in an engaging element receiving groove/groove 32, whereas the engaging element 31 sits in an engaging element receiving groove/groove 33 in the housing 3. The engaging element 30 is provided for latching/engaging insertion into scores/grooves 34, whereas the engaging element 31 is intended to engage in similar scores/grooves 35 in an insert 36 which is anchored in the piston 2. These scores/grooves 34 and 35 have a beveled surface. The axis of rotation is provided with the reference sign 37.

There are also a pair of bearings on the (intermediate) shaft 26.

Figure 8:
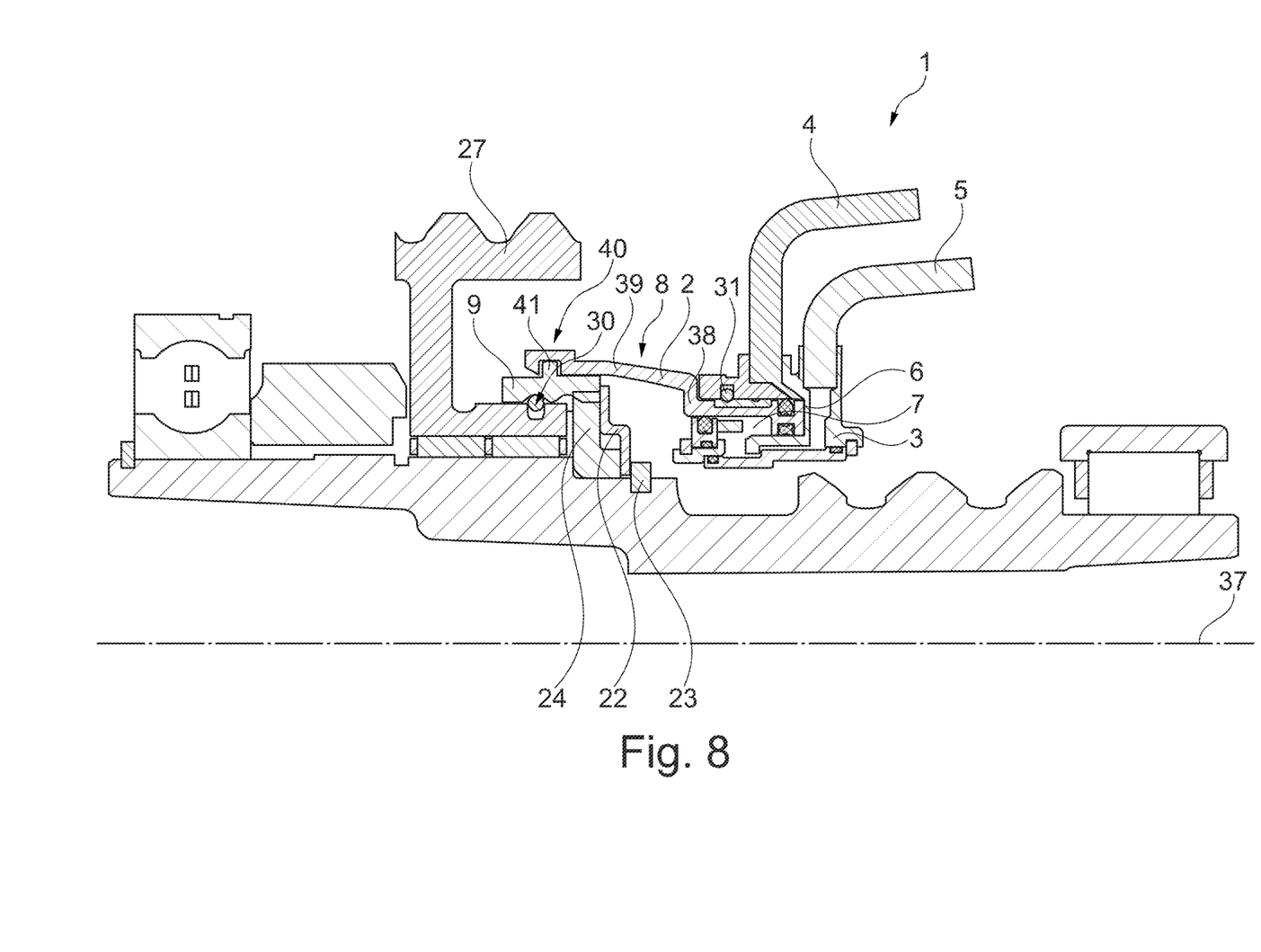
FIG. 8 shows a detail of a longitudinal section through the further clutch according to the disclosure in a second operating position, in which the switching sleeve and the actuating cap are in an axially displaced position relative to FIG. 7.

While the one position of the clutch is captured in FIG. 7, the other switching position of the clutch 1 is captured in FIG. 8.

Figure 9:
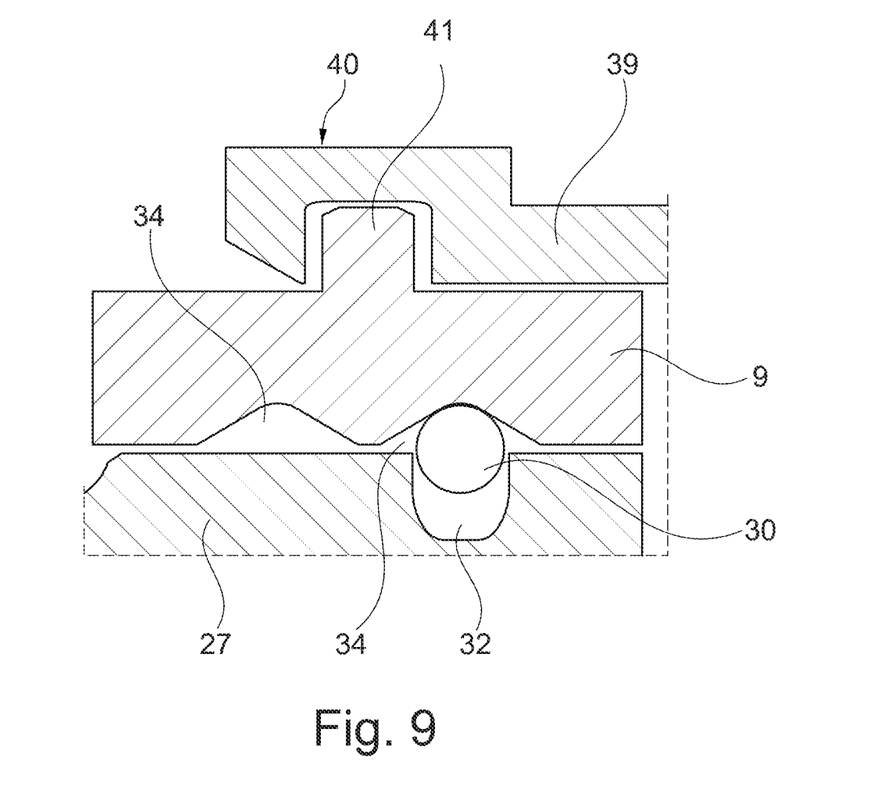
FIGS. 9 and 10 show the switching position details of the actuating cap, wherein in FIG. 9 a snap closure is shown enlarged in longitudinal section and in FIG. 10 a cantilever arm is shown enlarged in perspective.

Attention should also be drawn again to the design of the actuating cap 8 with a main body 38 which merges into a cantilever arm 39 that forms a snap closure 40 at its free end and surrounds a radial protrusion 41 of the switching sleeve/shift sleeve with axial play. See also FIG. 9.

Figure 10:
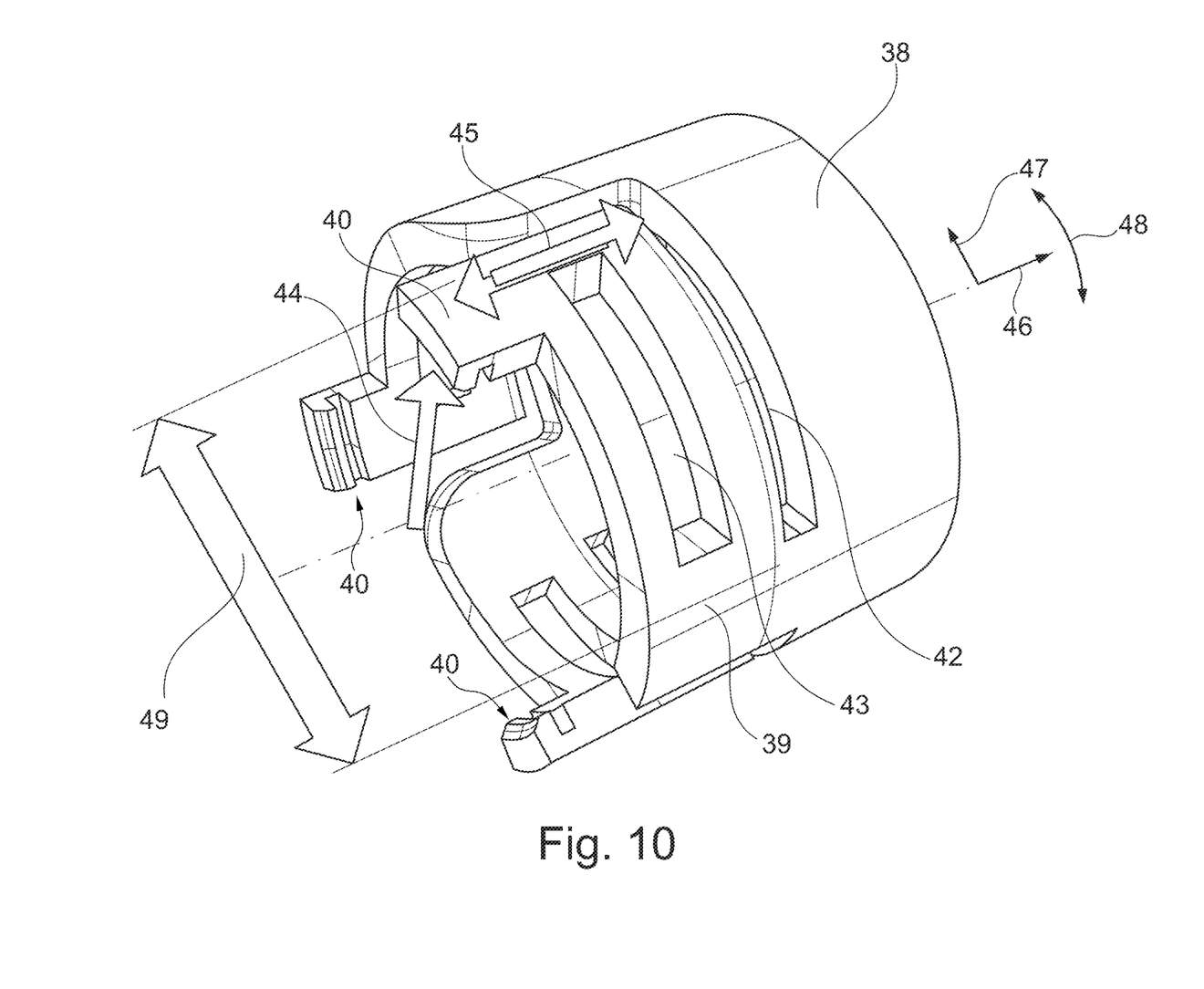

As also indicated in FIG. 10, the snap closure-like end of the cantilever arm 39 is designed in the manner of a clip or gripper. There is a slot 42 on the one hand and an elongated hole 43 on the other hand in order to specifically adjust the elasticities/rigidities shown with arrows 44 and 45.

As in FIG. 1, the axial direction is marked with the reference sign 46 and the radial direction with the reference sign 47 in FIG. 10. In FIG. 10, the circumferential direction is indicated by the reference sign 48.

The cantilever arm 39 thus represents a lever 49.

REFERENCE NUMERALS

1 Clutch
2 Piston/switching piston
3 Housing/(switching) cylinder
4 Pressure port
5 Pressure port
6 First pressure chamber
7 Second pressure chamber
8 Actuating cap
9 Shift sleeve/switching sleeve
10 Stop washer/baffle plate
11 First seat
12 Second seat
13 Seal
14 Seal
15 Axial protrusion
16 End face
17 Snap ring
18 Step
19 Pressure space sleeve
20 Pressure space sleeve snap ring
21 O-ring
22 End stop washer
23 Securing ring
24 Clutch body
25 Lateral surface
26 (Intermediate) shaft
27 Idler gear
28 Void
29 Groove
30 Engaging element
31 Engaging element
32 Engaging element receiving groove/groove
33 Engaging element receiving groove/groove
34 Score/groove
35 Score/groove
36 Insert
37 Axis of rotation
38 Main body
39 Cantilever arm
40 Snap closure
41 Radial protrusion
42 Slot/recess
43 Elongated hole
44 Elasticity/rigidity
45 Elasticity/rigidity
46 Axial direction
47 Radial direction
48 Circumferential direction
49 Lever

The invention claimed is:

1. A clutch for coupling and decoupling a motor from a motor vehicle drive train, comprising a piston which is arranged in a housing between two pressure chambers in a pressure-dependent axially moveable manner, wherein the piston is connected to an actuating cap which is designed for contacting or moving a shift sleeve, wherein at least one mechanical engaging element is designed and arranged between an axially moveable component and an axially fixed component such that the shift sleeve can be engaged in two different axial positions, and wherein the at least one mechanical engaging element is arranged in a spring-loaded manner in a seat in the axially fixed component in order to selectively engage in a latching manner in two grooves in the axially moveable component.

2. The clutch according to claim 1, wherein the grooves form a depression beveled on both sides.

3. The clutch according to claim 2, wherein an engagement or locking is forced when the at least one mechanical engaging element engages in one of the two grooves.

4. The clutch according to claim 1, wherein the at least one mechanical engaging element is shaped as a sphere or a ball.

5. The clutch according to claim 1, wherein:
the at least one mechanical engaging element comprises two mechanical engaging elements; and
two detents, each with a one of the two mechanical engaging elements, are provided at a same radial distance from an axis of rotation of the clutch.

6. The clutch according to claim 1, wherein the shift sleeve is connected to the actuating cap.

7. A clutch for selectively coupling a motor and a motor vehicle drive train, comprising:
- a housing comprising two pressure chambers;
- a shift sleeve;
- an actuating cap arranged for moving the shift sleeve;
- a piston arranged in the housing between the two pressure chambers in a pressure-dependent, axially movable manner and connected to the actuating cap; and
- an idler gear;
- a mechanical engaging element arranged between an axially movable component and an axially fixed component to engage the shift sleeve in two different axial positions, wherein:
  - the axially movable component is the shift sleeve or the piston;
  - the axially fixed component is the housing or the idler gear; and
  - the mechanical engaging element is a sphere or a ball.

8. The clutch of claim 7, wherein:
- the axially fixed component comprises a seat;
- the axially movable component comprises two grooves; and
- the mechanical engaging element is arranged in the seat in a spring-loaded manner to selectively engage one of the two grooves in a latching manner.

9. The clutch of claim 8, wherein each of the two grooves form a respective depression that is beveled on both sides.

10. The clutch of claim 9, wherein the shift sleeve is engaged in one of the two different axial positions when the mechanical engaging element engages in one of the two grooves.

11. The clutch of claim 7, wherein the shift sleeve is connected to the actuating cap.

* * * * *